UNITED STATES PATENT OFFICE.

ARTHUR J. PURINTON, OF WATERBURY, AND JOHN R. REYNOLDS, OF HARTFORD, CONNECTICUT, ASSIGNORS TO THE MONARCH MANUFACTURING COMPANY, OF WATERBURY, CONNECTICUT.

SYSTEM OF STOPPING STEAM-ENGINES.

SPECIFICATION forming part of Reissued Letters Patent No. 11,804, dated January 23, 1900.

Original No. 635,080, dated October 17, 1899. Application for reissue filed December 22, 1899. Serial No. 741,335.

*To all whom it may concern:*

Be it known that we, ARTHUR J. PURINTON, of Waterbury, in the county of New Haven, and JOHN R. REYNOLDS, of Hartford, in the county of Hartford, State of Connecticut, citizens of the United States, have invented a new and useful Improvement in Systems of Stopping Steam-Engines, of which the following is a specification.

This invention relates to a system constructed for stopping condensing-engines by power which can be set in operation from the engine-room for making the usual and necessary stops, or which can be operated from different points about the plant when emergencies arise.

The object of the invention is to provide a system of this nature which will surely operate to stop the engine quickly and in a manner that will not cause damage to the engine or any of the connected parts. This object is attained by connecting the throttle-valve in the steam-main with an electromagnetic stop that instantly automatically closes the throttle and shuts off the steam when set in operation and by connecting either the exhaust-pipe or the condenser with an electromagnetic vacuum-breaker that is in electrical connection with the stop and that instantly when the stop is set in operation automatically opens a port and, permitting the entrance of air to the condenser, destroys the vacuum and obviates all danger of pumping water into the cylinders, as more particularly hereinafter described, and pointed out in the claims.

Of the accompanying views, which illustrate an embodiment of the invention, Figure 1 represents a vertical triple-expansion engine of a type built for electric light and power stations, with a surface-condenser mounted upon a combined air and circulating pump, an electromagnetic stop connected with the throttle-valve in the main between the boiler and the valve-chamber, and an electromagnetic vacuum-breaker connected with the condenser and with the stop-operating circuit. Fig. 2 represents a section of a form of vacuum-breaker, and Fig. 3 represents another form of vacuum-breaker.

The cylinders 1 of the vertical triple-expansion engine represented are connected by a main 2 with a boiler 3 and by an exhaust-pipe 4 with a surface-condenser 5, mounted upon the air-pump 6 and the water-pump 7. These pumps, with the combined pump-cylinders 8, are supported upon a bed 9, which also supports each side of the engine the generators 10.

The spindle of the throttle-valve 11, with its hand-wheel 12, is provided with a sprocket-wheel 13, and this is connected by a chain 14 with an electromagnetic engine-stop 15, supported upon a standard 16. This stop is of the nature of that shown and described in the United States Patent No. 599,014, granted February 15, 1898, and is connected with the electric-circuit wires 17, that lead from the battery 18. These circuit-wires may be led to any part of the plant and may be provided with one or more push-buttons 19. The battery may be a storage battery of common elements and connected with the generator by circuit-wires 20, or it may be an ordinary primary battery, in which case it would not be connected with the generator.

Leading from the vacuum-chamber of the condenser to the electromagnetic vacuum-breaker 21 is an exhaust-pipe 22. This vacuum-breaker is supported by a column 23 and connected by wires with the circuit 17. When the button is pushed and the circuit is closed, the stop is released and allowed to operate and close the throttle-valve, as described in the patent referred to, and the vacuum-breaker is tripped, so that the vacuum-exhaust will be opened, both the stop and the breaker, being upon the same circuit, acting simultaneously.

The vacuum-breaker illustrated in Fig. 1 is represented on larger scale in Fig. 3, in which parts are broken away to show the arrangement of this form of breaker. In the shell 24 in this form is a piston-valve 25, that is movable in the valve-chamber toward and from the seat 26 in such a direction that it is held to the seat by the influence of the vacuum in the condenser and acting through the exhaust-pipe 22. This valve is provided with guiding-lugs 27, and through the wall of the shell to the valve-chamber is an opening 28.

Opening into the shell on the vacuum side of the piston-valve is a passage 29, and in this passage is a plunger-valve 30. An opening 49 is made from the valve-chamber above the piston-valve 25 to the passage 29 above the plunger-valve 30. The stem of this plunger-valve is connected with a lever 31. A spring 32 is also connected with this lever and normally tends to pull down one end and lift the valve from its seat. The oscillation of the valve-lever in this manner, however, is prevented by the trip-lever 33. This trip-lever is held in engagement with the valve-lever by a spring 34 and is provided with an armature 35, that is so attracted when the magnet 36 is excited as to release the trip-lever from the valve-lever and allow the valve-lever to be moved by its spring. When this lever is moved by its spring, the plunger-valve is lifted from its seat, so that the effect of the vacuum will be exerted through the passage 29 and opening 49 upon the upper side of the piston-valve, and as the upper area of the piston-valve is greater than the lower area that is exposed through the valve-seat the piston-valve is instantly lifted from its seat by atmospheric pressure exerted on its under side through the port 28, which then being opened admits air and causes the vacuum to be broken.

In the form illustrated in Fig. 3 the spring-operated plunger-valve is located in a passage at one side of the main piston-valve chamber, while in the form illustrated in Fig. 2 the plunger-valve is located at the center of the piston-plunger.

The piston-valve 37 of Fig. 2 is movable in the shell 38 toward and from the seat 39 and is provided with guiding-ribs 40. There is a passage 41 through the center of this piston-valve, and this passage is closed at one end by the plunger-valve 42, the stem of which is connected with the valve-lever 43. This valve-lever has a spring 44 and is normally held from movement by a trip-lever 45, having an armature 46, that is attracted when the magnet 47 is excited. In this instance when the magnet is excited and the trip-lever releases the valve-lever the spring of that lever causes the plunger-valve to be lifted, and this allows the effect of the vacuum to be exerted through the passage 41 upon the larger area of the piston-valve, so that the piston-valve will be thrown open and open the passage 48 in the shell, and thus entirely break the vacuum.

As the throttle-valve closer and vacuum-breaker are operated by springs held tense by means of trips that are released by magnets in the same circuit, the operations of these mechanisms are simultaneous.

By means of this system the engineer at the stated times or any operative when an emergency arises may by touching a button surely and quickly stop the engine without danger or damage, for before the stop can operate to turn the valve sufficiently to completely throttle the live steam the vacuum-breaker will have opened the exhaust, so as to break the vacuum, and this reduces the pull upon the pistons and also obviates any liability of sucking water from the condenser into the cylinders by the continued movement of the pistons, due to the momentum of the parts.

We claim as our invention—

1. An engine-stopping system consisting of an electromagnetic stop connected with a throttle-valve in the steam-main, an electromagnetic vacuum-breaker connected with the condenser, and an electric circuit connecting the stop and the vacuum-breaker with a supply of electrical energy, substantially as specified.

2. In combination with the condenser of a steam-engine, an electromagnetic vacuum-breaker, and an electric circuit connecting the vacuum-breaker with a supply of electrical energy whereby, when the circuit is closed, the vacuum-breaker is freed and allowed to operate and open a passage from the outer air to the condenser-chamber, substantially as specified.

3. A vacuum-breaker consisting of a shell adapted to be connected with a condenser-chamber, a piston-valve normally held to its seat in the shell by the influence of the vacuum and closing a port through the shell, a plunger-valve normally closing a passage from one side to the other side of the piston-valve, a spring tending to move the plunger-valve and open the passage, a trip normally holding the plunger-valve against movement, and an electromagnet for causing the trip to release the plunger-valve, substantially as specified.

ARTHUR J. PURINTON.
JOHN R. REYNOLDS.

Witnesses as to Arthur J. Purinton:
E. S. BABCOCK,
H. B. MUZZY.

Witnesses as to John R. Reynolds:
HARRY R. WILLIAMS,
F. G. HOLCOMBE.